United States Patent [19]
Meyer et al.

[11] Patent Number: 6,017,086
[45] Date of Patent: Jan. 25, 2000

[54] VEHICLE SEAT WITH HEAD SUPPORT

[75] Inventors: Thomas Meyer, Amberg; Erwin Haller, Birgland; Peter Eidenhammer, Marzling, all of Germany; Steffan Hermann, Linz, Austria

[73] Assignee: Grammer AG, Amberg, Germany

[21] Appl. No.: 09/291,754

[22] Filed: Apr. 14, 1999

[30] Foreign Application Priority Data

Apr. 22, 1998 [DE] Germany .......................... 198 17 980

[51] Int. Cl.⁷ ...................................................... B60N 2/42
[52] U.S. Cl. .................................. 297/216.12; 297/216.1
[58] Field of Search ........................... 297/216.1, 216.12, 297/410, 391, 407, 406, 216.13

[56] References Cited

U.S. PATENT DOCUMENTS

| | | |
|---|---|---|
| 3,420,572 | 1/1969 | Bisland . |
| 5,080,436 | 1/1992 | Meiller . |
| 5,590,929 | 1/1997 | Hamelin . |
| 5,927,804 | 7/1999 | Cuevas . |

FOREIGN PATENT DOCUMENTS

| | | |
|---|---|---|
| 29601798 | 7/1996 | Germany . |
| 19738201 | 4/1998 | Germany . |

*Primary Examiner*—Milton Nelson, Jr.
*Attorney, Agent, or Firm*—Elliot M. Olstein; Raymond J. Lillie

[57] ABSTRACT

In a vehicle seat having a backrest portion and a head support carried on the backrest portion by a connecting device, to reduce whiplash risk by forward displacement of the head support into a more effective head-supporting position, a displacement device is linearly movably carried on the backrest portion of the seat. The displacement device has a sliding guide arrangement on which the head support connecting device is so guided that displacement of the displacement device in the transverse direction of the seat causes displacement of the head support forwardly of the seat. The displacement device is connected for displacement thereof to a pyrotechnic drive element on the backrest portion, with the drive element being activated by a vehicle-specific acceleration sensor.

7 Claims, 1 Drawing Sheet

VEHICLE SEAT WITH HEAD SUPPORT

FIELD OF THE INVENTION

The invention generally concerns a vehicle seat and more specifically a vehicle seat including a head support.

BACKGROUND OF THE INVENTION

A typical form of vehicle seat with head support mounted thereon comprises a seat portion or squab and a backrest portion with a head support which is mounted to the upper edge of the backrest portion by a suitable form of connecting arrangement. It will be appreciated that, while that is a generally typical basic configuration for a vehicle seat with a head support, there are many different variations on that theme, resulting in a wide range of different structural configurations.

As the head of a seat occupant is usually disposed at a spacing from the head support of the vehicle seat, it has been found that, in particular with collision impact speeds of up to about 15 kph, there is the danger of the occurrence of the injury usually referred to as whiplash trauma involving a shearing loading being applied to individual cervical vertebrae. In order to at least obviate such whiplash injury, for example DE 296 01 798 U1 has already proposed integrating into the head support of the vehicle seat a structure in the nature of an air bag in order to provide for forward displacement of the head support in relation to the vehicle seat in the event of a collision or impact situation in the tail region of the respective vehicle in which the vehicle seat is fitted. Integrating an arrangement of that kind into the head support however suffers from the disadvantage that the head support is effectively no longer an autonomous or self-contained unit and therefore cannot be easily removed from the backrest of the vehicle seat, or that the shape of the head support is correspondingly influenced or indeed impaired by virtue of the integration of the air bag arrangement.

A vehicle seat having a head support is to be found in DE 197 38 201 A1, including an arrangement whereby, in the event of vigorous acceleration or deceleration in the direction of travel of the vehicle, for example in a collision accident, the head support is automatically inclined forwardly and is locked in that position. In that case the head support can be fixedly connected to at least one support bar, the guide for which has a lower support bar guide element which can be locked in respect of height to the support bar and which is arranged on the backrest carrier structure pivotably about a horizontal axis which is parallel to the backrest carrier structure. In that arrangement an upper support bar guide element can be disposed at a spacing relative to the lower support bar guide element, which carries the support bar displaceably in respect of height and which is arranged on the backrest carrier structure pivotably about a horizontal axis which is parallel to the backrest carrier, wherein the upper support guide bar element is connected to the backrest carrier by way of a pivotable arm which is mounted to the backrest carrier structure and to the upper support bar guide element and which, upon pivotal movement thereof, changes the spacing between the upper support bar guide element and the backrest carrier structure. For pivoting the arm for the purposes of increasing the spacing between the upper support bar guide element and the backrest carrier structure, that arrangement has a device which is responsive to vehicle acceleration or deceleration. That device can be a leaf spring disposed in the region of the buttocks of the person occupying the vehicle seat, in the backrest of the vehicle seat.

SUMMARY OF THE INVENTION

An object of the present invention is to provide a vehicle seat having a head support, in which the head support is adapted to be displaced forwardly as in the event of a collision situation in the tail region of the corresponding vehicle, using simple means.

Another object of the present invention is to provide a vehicle seat with actively operable head support which is adapted to be moved into an operative position for supporting the head of the occupant of the vehicle seat in a likely whiplash-inducing situation, wherein the head support is an autonomous unit and is thus removable if required from the backrest.

A further object of the invention is to provide a vehicle seat incorporating a head support displaceable into an actively head-supporting position in a controlled manner while affording rapid response to an event triggering displacement of the head support.

In accordance with the principles of the present invention the foregoing and other objects are attained by a vehicle seat having a backrest portion and a head support which is mounted to the backrest portion by connecting means. Provided linearly movably on the backrest portion is a displacement means including a sliding guide or control means on which the head support connecting means is guided in such a way that displacement of the displacement means in the transverse direction of the vehicle seat produces displacement of the head support forwardly in the longitudinal direction of the seat. For displacement of the displacement means, the displacement means is connected to a pyrotechnic actuating or drive element provided on the backrest portion. For activation thereof, the drive element is connected to an acceleration sensor device which is particular or specific to the vehicle in which the vehicle seat is fitted.

As will be seen from a description hereinafter of a preferred embodiment of the vehicle seat according to the invention, the provision of the displacement means with the sliding guide or control means and the pyrotechnic actuating or drive element for linear displacement of the displacement means in relation to the backrest portion affords the advantage that the head support itself is a self-contained structure and consequently can also be removed if necessary from the backrest portion of the motor vehicle seat. That may be required for example when the vehicle seat is being fitted into the vehicle for which it is intended. The head support of the vehicle seat according to the invention can be adjustable in respect of height in relation to the backrest portion manually or by motor means. The pyrotechnic drive element for displacement of the displacement means in the transverse direction of the vehicle seat and thus for producing the displacement of the head support forwardly in the longitudinal direction of the seat may be a pyrotechnic actuating or drive element of generally known configuration, as is used for example in relation to belt tensioners for vehicle seats. The vehicle-specific acceleration sensor device is for example a unit which can be referred to as a crash sensor, as is used for example in relation to belt tensioners or air bags in vehicles.

In a preferred feature of the vehicle seat according to the invention the displacement means may have a plate element which is disposed at the upper end part of the backrest portion, in such a way as to be linearly movable in the transverse direction of the backrest portion. The connecting means may comprise first and second spaced-apart bar or rod elements and the plate element of the displacement means can be formed with first and second mutually separate sliding guide slots forming the sliding guide or control means and through which the two bar or rod elements extend. A suitable design configuration of the two sliding guide slots makes it possible easily to arrive at simple establishment of the kinematics involved, that is to say the displacement travel of the head support in a forward direction as well as the speed or acceleration of the displacement movement, that is to say its 'aggressiveness'.

In accordance with a further preferred feature of the invention the sliding guide slots may have an active displacement end portion with a detent or retaining means provided for fixing the forwardly displaced bar or rod elements with the head support. Such a design configuration can afford the advantage that the forwardly displaced head support is secured in its forwardly displaced position, and that is preferable from safety points of view.

In order to prevent unwanted, limited movements of the displacement means in its inactive position, that is to say its position in which it has not been triggered by the pyrotechnic drive element, in accordance with another preferred feature of the invention the plate element can be held fast in its normal inactive position by means of a holding element. That holding element can be for example a shear pin extending into a hole or opening in the plate element. If the plate element is accelerated by means of the pyrotechnic drive element to displace the head support forwardly in the longitudinal direction of the vehicle seat, then the holding element formed by the shear pin is sheared off and the plate element is moved linearly, as described above. In order to facilitate shearing of the shear pin or to achieve a defined shearing characteristic, the shear pin can be provided for example with a weakened location thereon at which shearing rupture thereof is intended to occur. It may be appropriate for the same purpose for the hole or opening in the plate element to be formed with a shearing edge.

In accordance with another preferred feature of the invention, in regard to the vehicle seat according to the invention it has been found desirable if the pyrotechnic drive element is provided for activation within a time interval of between about 50 and 60 msec with a vehicle collision speed of up to about 15 kph. It is known from accident analysis procedures, sledge tests with dummies and from actual collisions that a head support must be activated within the time of between about 50 and 60 msec with a vehicle collision speed of up to about 15 kph in order to afford optimum effect. It is that short period of time that makes it necessary to use a pyrotechnic drive element. Upon activation of the pyrotechnic drive element the displacement means is linearly displaced in the transverse direction of the seat. When that happens, the head support is moved forwardly in the longitudinal direction of the seat, by virtue of the action of the sliding guide or control means. The head support is then fixed in its forwardly displaced limit position by the above-mentioned detent or retaining means of the sliding guide means.

Further objects, features and advantages of the present invention will be apparent from the description hereinafter of a preferred embodiment thereof.

DESCRIPTION OF THE PREFERRED EMBODIMENT

Figure 1:
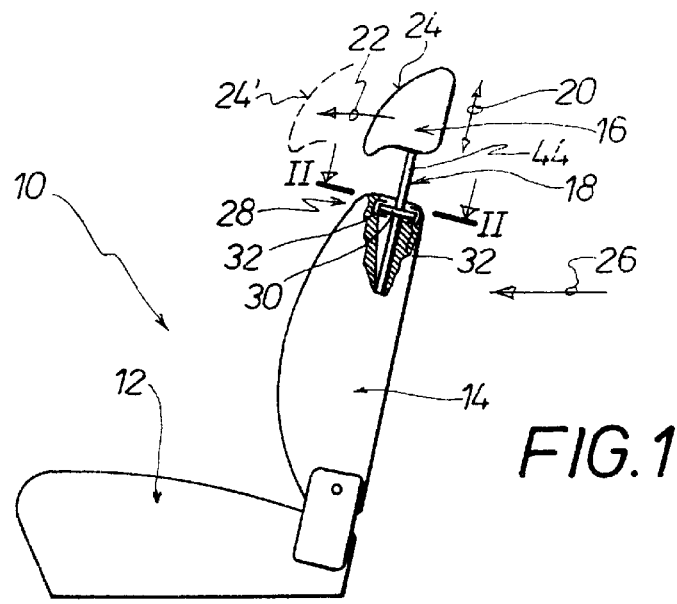
FIG. 1 is a partly sectional side view of a vehicle seat according to the invention.

Referring firstly to FIG. 1, shown therein in diagrammatic form is a vehicle seat 10 comprising a seat portion or squab 12 from which a backrest portion 14 extends generally upwardly. The backrest portion 14 is shown partially in section in FIG. 1.

Disposed on the backrest portion 14 at the upper end thereof in FIG. 1 is a head support 16 which is mounted to the backrest portion 14 by way of a suitable connecting means generally indicated diagrammatically at 18. The head support 16 is preferably mounted adjustably in respect of height on the backrest portion 14. That heightwise adjustability is indicated by the double-headed arrow 20 in FIG. 1. The head support 16 is also displaceable forwardly in the longitudinal direction of the seat, that is to say in a direction which is parallel to the longitudinal axis of a vehicle in which the vehicle seat 10 is fitted. That forward displacement of the head support 16 is indicated by arcuate arrow 22 in FIG. 1. The head support 16 or more specifically the front outline 24 thereof is indicated by a thin broken line 24' in the forwardly displaced position of the head support. That forward displacement of the head support 16 occurs in a vehicle collision situation indicated by arrow 26, wherein the vehicle in which the vehicle-seat 10 is fitted has been impacted in the rear, causing forward acceleration of the vehicle seat 10.

Figure 2:
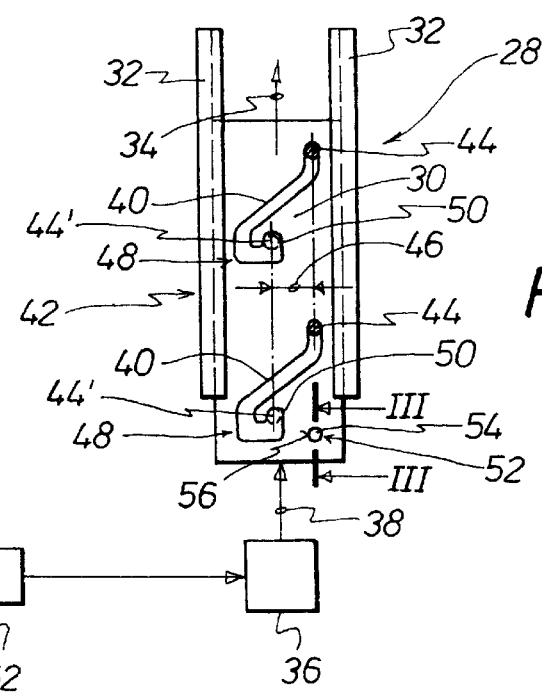
FIG. 2 is a view in section taken along section line II—II in FIG. 1 on an enlarged scale.

As can also be seen from FIG. 2, provided on the backrest portion 11 is a displacement means diagrammatically indicated in FIG. 1 at 28. The structure of the displacement means 28 can be more clearly seen from FIG. 2 from which it will be apparent that the displacement means 28 includes a plate element 30. The plate element 30 is disposed on a guide arrangement 32 linearly displaceably in the transverse direction of the motor vehicle, that is to say, in transverse relationship with respect to the longitudinal direction of the seat or the longitudinal center line of the vehicle, as referred to hereinbefore. The displacement of the plate element 30 is indicated by arrow 34 in FIG. 2.

Linear displacement of the plate element 30 of the displacement means 28 is effected by a pyrotechnic drive element 36 which is diagrammatically indicated by a block in FIG. 2. The operative connection between the pyrotechnic drive element 36 and the plate element 30 of the displacement means 28 is indicated in FIG. 2 by the arrowed line 38.

The plate element 30 of the displacement means 28 is formed with first and second shaped sliding guide or control slots 40 of the respective configuration shown in FIG. 2, which form a sliding guide or control means 42 for the displacement means 28. The connecting means 18 for connecting the head support 16 to the backrest portion 14 has first and second spaced-apart rod or bar elements indicated at 44, which extend through the slots 40 in the plate element 30 of the displacement means 28. In FIG. 2 the two bar or rod elements 44 of the connecting means 18 are shown diagrammatically in solid lines and with hatching in their normal inactive position and in thin broken lines, at the positions indicated by reference 44', after corresponding activation of the pyrotechnic drive element 36, in their active position in which the head support has thus been displaced forwardly, being therefore the position indicated in FIG. 1 by the forwardly displaced front outline referenced 24' of the head support 16. Therefore, depending on the configuration of the slots 40 and the cam control effect afforded thereby, this arrangement provides for a given forward displacement movement of the head support 16 which is indicated by double-headed arrow 46 in FIG. 2. It will be appreciated that the cam control configuration of the slots 40 also affords the desired 'aggressiveness' in terms of the forward displacement of the head support in the longitudinal direction of the seat, as indicated by the arcuate arrow 22 in FIG. 1.

So that the head support 16 can be fixed in the forwardly displaced position corresponding to the front outline indicated at 24' thereof in FIG. 1, the slots 40 are formed with a detent or retaining portion 50 at their active displacement end part 48. It will be seen therefore that each slot 40 comprises a first end part in which the bar elements 44 are disposed in the inactive position of the head support 16, an inclined central part which implements forward displacement of the head support 16, a return part which extends from the inclined central part back towards a notional line joining the bar elements 44 when in the first-mentioned end part of the respective slots 40, and the retaining end part indicated at 50.

In order to hold the plate element 30 of the displacement means 28 fast in its normal inactive position, in other words in order for example to prevent rattling or shaking movements or the like of the plate element 30, the arrangement may further include a holding element indicated at 52.

Figure 3:
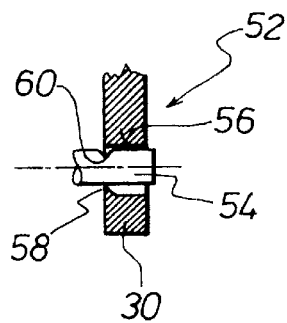
FIG. 3 is a view in section taken along section line III—III in FIG. 2 on a further enlarged scale.

Referring now also to FIG. 3, the holding element 52 can be formed by a shear pin 54 of which a portion is shown in FIG. 3 and which extends into a hole or opening 56 in the plate element 30 of the displacement means 28. The hole or opening 56 in the plate element 30 can be formed with a shearing edge 58 and the shear pin 54 can be formed with a defined weakened location 60 at which it is intended to involve shearing rupture, in order to facilitate the shear pin 54 being sheared off when the pyrotechnic drive element 36 is activated. Activation of the pyrotechnic drive element 36 in FIG. 2 is implemented by means of a vehicle-specific acceleration sensor device which is diagrammatically indicated by a block 62 in FIG. 2, for example a crash sensor.

It will be seen from the foregoing description of the structure of the vehicle seat according to the invention that, upon activation of the pyrotechnic drive element 36, the displacement means 28 is linearly displaced in the transverse direction of the seat. When that happens, the sliding co-operation of the bar elements 44 supporting the head support 16 and the sliding guide slots 40 causes the head support 16 to be moved forwardly in the longitudinal direction of the seat with a vigorous but controlled movement. The head support 16 is then secured in its forwardly displaced limit position by virtue of the latching engagement of the bar elements 44 in the retaining end parts 50 of the respective slots 40.

The vehicle seat according to the invention has the considerable advantage that the usual problems involved with the phenomenon known as 'out-of-position', as occurs for example by virtue of a head bearing against the head support, are eliminated by the relatively low displacement speeds and by virtue of the provision of a suitable 'sloop curve' in respect of the pyrotechnic drive element 36. More specifically, if the head of a seat occupant is bearing against the head support during normal travel of the vehicle, there would be a corresponding increase in the levels of mass inertia by about three times so that the generator output of the pyrotechnic drive element would no longer suffice to accelerate those increased masses, that is to say the sum of the mass of the head support and the mass of the head of the seat occupant, in an injury-typical situation.

The vehicle seat according to the invention provides that the number of parts and components thereof can be reduced to a minimum and they move along simple paths of motion. The configuration of the sliding guide means of the displacement arrangement of the vehicle seat according to the invention can be easily matched to the various possible demands such as for example the displacement travel of the head support in a forward direction and the degree of aggressiveness involved in such displacement, as already indicated above. Further advantages are that the pyrotechnic drive element is disposed in the backrest portion of the seat so that, in the event of faulty triggering or in the event of damage to the pyrotechnic drive element, there is no direct risk to the seat occupant. The pyrotechnic drive element 36 forms a closed or self-contained system, which means that no gases which are likely to cause damage to health can escape. Furthermore, no pressure peaks are produced in the interior of the vehicle, which would give rise to the generation of cracking or popping noises which can result in hearing damage or the like. Furthermore, as also already indicated above, the vehicle seat according to the invention provides that the head support is a self-contained and autonomous unit and consequently if necessary can also be removed from the vehicle seat backrest portion. The invention does not involve any limiting factors in regard to the shape and configuration of the head support which can thus be of the form that is most suited to its purpose. The head support of the vehicle seat according to the invention can also be adjustable in terms of height as required. That heightwise adjustment may also involve automatic adjustment which forms an important safety gain.

It will be appreciated that the above-described embodiment of the invention has been set forth solely by way of example and illustration of the principles thereof and that various modifications and alterations may be made therein without thereby departing from the spirit and scope of the invention.

What is claimed is:

1. A vehicle seat including
  a backrest portion,
  a head support,
  connecting means mounting the head support to the backrest portion,
  a displacement means linearly movable on the backrest portion, the displacement means comprising a sliding guide means guiding the head support connecting means and operable to produce displacement of the head support forwardly in the longitudinal direction of the seat in response to displacement of the displacement means in the transverse direction of the vehicle seat, and
  a pyrotechnic drive means on the backrest portion and operatively connected to the displacement means for displacement thereof, the pyrotechnic drive means being connected to a vehicle-specific acceleration sensor means for activation of the pyrotechnic drive means.

2. A vehicle seat as set forth in claim 1
  wherein the backrest portion has an upper end part, and said displacement means includes
    a plate element, and
    means mounting said plate element to said upper end part of said backrest portion linearly movably in the transverse direction thereof.

3. A vehicle seat as set forth in claim 2
  wherein said connecting means includes first and second spaced-apart bar elements, and
  wherein said plate element of said displacement means has first and second mutually separate sliding guide slots which form said sliding guide means and through which said bar elements extend.

4. A vehicle seat as set forth in claim 3 wherein said sliding guide slots have an active displacement end part with a detent configuration for fixing the position of said bar elements with said head support after forward displacement thereof.

5. A vehicle seat as set forth in claim 2 and further including a holding means for holding said plate element fast in its normal inactive position.

6. A vehicle seat as set forth in claim 5 wherein said plate element has an opening therein and said holding means includes a shear pin extending into said opening in said plate element.

7. A vehicle seat as set forth in claim 1 wherein said pyrotechnic drive means is operable for activation within a time of between about 50 and 60 msec at a vehicle collision speed of up to about 15 kph.

* * * * *